United States Patent [19]

Hoshino et al.

[11] Patent Number: 4,467,370
[45] Date of Patent: Aug. 21, 1984

[54] PCM RECORDER WITH PAUSE CONTROLLED SIGNAL REARRANGING

[75] Inventors: Takashi Hoshino, Fujisawa; Hiromichi Tanaka, Yokohama, both of Japan

[73] Assignee: Hitachi, Ltd., Tokyo, Japan

[21] Appl. No.: 304,900

[22] Filed: Sep. 23, 1981

[30] Foreign Application Priority Data

Sep. 26, 1980 [JP] Japan .................................. 55-132928

[51] Int. Cl.³ ............................................. G11B 27/02
[52] U.S. Cl. ....................................... 360/13; 360/14.1
[58] Field of Search ................. 360/13, 14.1, 32, 33.1, 360/39, 40; 358/143–147, 311, 335, 314, 336, 38.1, 36, 167

[56] References Cited

U.S. PATENT DOCUMENTS

| | | | |
|---|---|---|---|
| 4,121,262 | 10/1978 | Ushio et al. ............................ | 360/13 |
| 4,204,227 | 5/1980 | Gurley ................................... | 358/138 |
| 4,303,988 | 12/1981 | Tsaboka et al. ...................... | 360/32 X |
| 4,327,382 | 4/1982 | Tanaka ................................. | 360/32 X |
| 4,345,272 | 8/1982 | Shirota ................................. | 358/21 R |
| 4,363,049 | 12/1982 | Ohtsuki et al. ....................... | 360/32 X |
| 4,392,162 | 7/1983 | Yamamoto ........................... | 360/38.1 X |

FOREIGN PATENT DOCUMENTS

| | | | |
|---|---|---|---|
| 0029226 | 5/1981 | European Pat. Off. ............. | 360/32 |
| 1438716 | 6/1976 | United Kingdom ................. | 360/32 |

OTHER PUBLICATIONS

Popular Electronics: Sep. 1979, pp. 39–44, Rodgers et al., "A Close Look at Digital Audio".

"The Use of Microcomputers and Microprocessors in Modern VTR Control", Geise SMPTE, Dec. 1979, vol. 88.

"Distributed Processing in Editing Systems", Geise, Bosch, Techn. Berichte, May 25, 1979.

*Primary Examiner*—Aristotelis M. Psitos
*Attorney, Agent, or Firm*—Antonelli, Terry & Wands

[57] ABSTRACT

A PCM recorder includes an A/D converter for converting an analog signal to a digital signal, an interleave unit for pseudo-randomizing the digital signal by rearranging on time base, a video tape recorder for recording the pseudo-randomized digital signal on a video tape, and a control circuit for controlling the interleave unit and the video tape recorder in a synchronized manner. Since the video tape recorder and the interleave unit are synchronously controlled, discontinuity of data at the joint of recording can be prevented even if recording is paused and restarted.

12 Claims, 10 Drawing Figures

PCM RECORDER WITH PAUSE CONTROLLED SIGNAL REARRANGING

This invention relates to pulse code modulation (PCM) recording and particularly to PCM recording using interleave and capable of easy editing.

The PCM recording is performed by use of, for example, a video tape recorder (VTR). In this PCM recording, an analog signal is converted to a digital signal, and the digital signal is rearranged to be dispersed on time axis to form an interleaved signal, which is then recorded. In other words, a time sequence of data is spatially dispersed and recorded on a magnetic tape.

In analog signal recording, editing is performed by selecting and connecting necessary portions of a recorded magnetic tape. However, in the PCM recording, since data which are continuous on time axis are spatially dispersed on a magnetic tape, when the recorded magnetic tape is cut and joined for editing while monitoring the original sound or reproduced sound, unnecessary data are included and/or necessary data are lost.

In addition, in the PCM recording with use of VTR, when the recorded video tape is cut and connected at arbitrary locations, the video synchronizing signal becomes discontinuous at the jointed portion.

Such discontinuity of the synchronizing signal and data at the joint will cause cutoff or muting of reproduced sound, or generation of abnormal sounds upon playback.

When necessary data are successively recorded on a single tape by repeating recording and pause, similar problems exist at the connection of adjacent pieces of recording.

In order to reduce the effect of the discontinuity at the connection, recording may be paused and restarted at a portion where the original sound is absent or very small. However, this does not give a substantial solution to this problem and limits the possibility of edition. Thus, in the PCM recording utilizing interleaving process, an effective editing has not been developed yet.

It is an object of the invention to provide PCM recording eliminating the above conventional drawbacks and capable of editing recorded media without causing discontinuity at the connection.

According to an aspect of the invention, there is provided a PCM recorder in which the recording operation on a recording medium and the operation of the interleave unit are controlled in synchronism. In the case of a PCM recorder using a VTR, the synchronizing signal and data are prevented from being discontinuous on a video tape. The position in a video tape at which recording is paused can be selected at a predetermined position in the video synchronizing period, and the operation of the interleave unit can be stopped in synchronism with the pause of the video tape. Recording may be restarted at the predetermined position of the video synchronizing period. This position in the video synchronizing signal can be detected by a timing detector.

The interleave unit may include a memory for delaying words. The memory may be formed of a random access memory, which is written and read under the control of a clock signal associated with the video synchronizing signal. The clock signal to be supplied to the memory of the interleave unit may be gated in response to the pause signal which orders the recorder to pause recording. During pause, the gate of the clock signal is closed to prevent the application of the clock signal to keep the contents of the memory substantially unchanged. Therefore, necessary data is not lost from and undesired data is not written in the memory of the interleave unit.

Other objects, features and advantages of the invention will be apparent from the description of the embodiment which will be made below with reference to the accompanying drawings.

There have been proposed various PCM recording systems using VTR. In June, 1979, Electric Industries Association of Japan announced the standard specifications of NTSC system PCM recording in the Technical File of Stereo Technical Committee and Video Technical Committee, STC-007, and in January, 1981 announced the standard specifications of PAL and SECAM system PCM recording in the Technical File of Stereo Technical Committee and Video Technical Committee, STC-008.

An exemplary embodiment of the invention, based on the standard specifications of NTSC system PCM recording, will hereinafter be described. This invention can be equally applied to the PAL and SECAM systems or other systems. It will become apparent that this invention is effective for the PCM recording in which digital data are recorded dispersedly on a recording medium.

Figure 2:
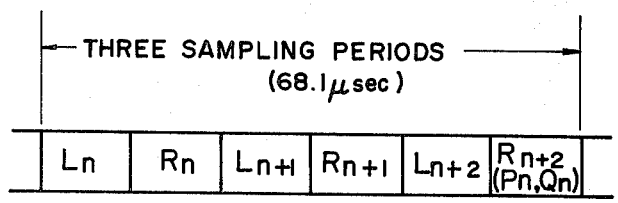
FIGS. 2 and 3 show digital data formats in the PCM recorder system.
Figure 6:
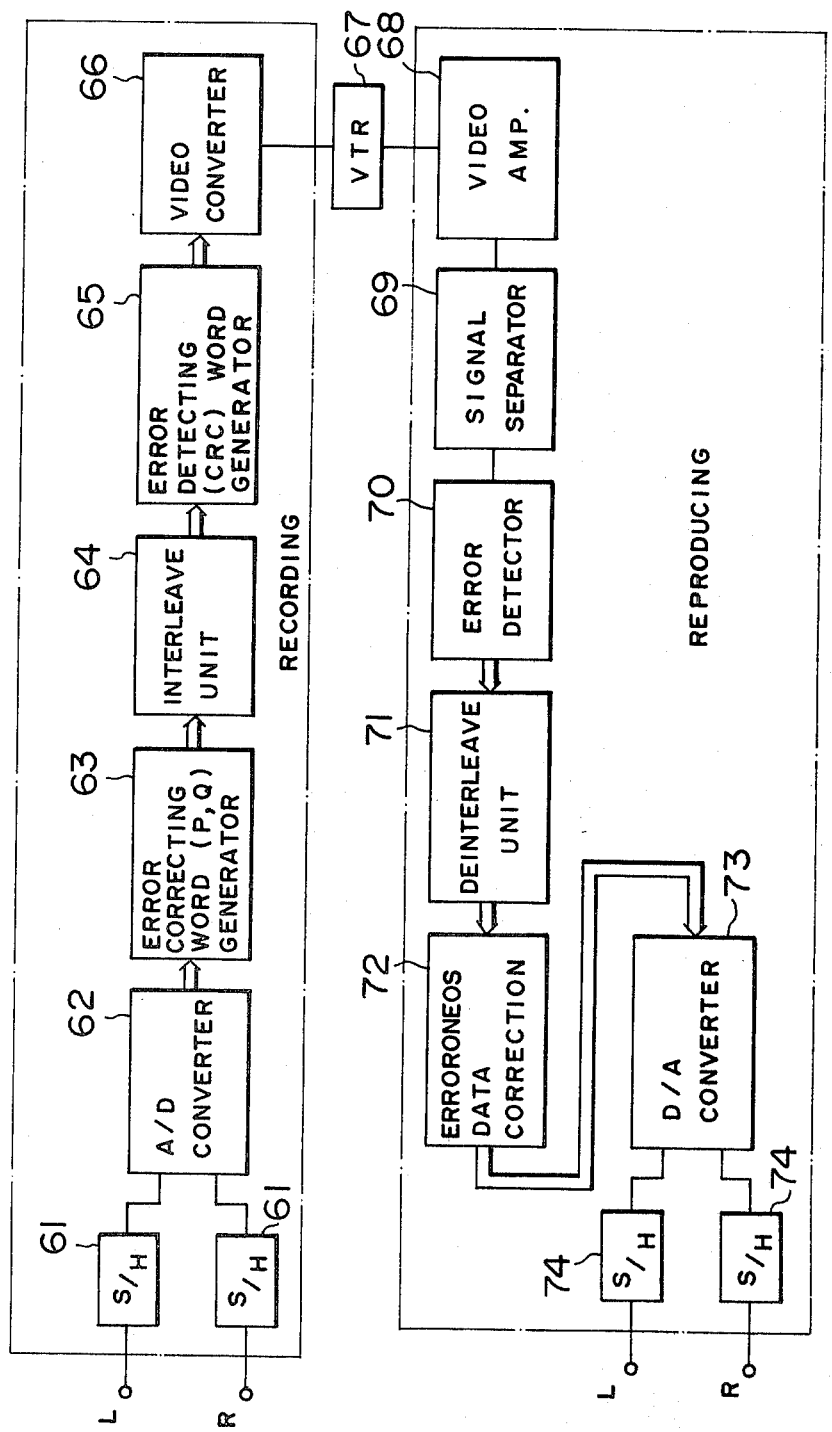
FIG. 6 is a block diagram of a PCM recorder system using a VTR.

FIG. 6 is a block diagram of a PCM recorder system using a VTR. Analog signals (left and right-channel stereo signals) are supplied via audio input terminals L and R to sample-and-hold (S/H) circuits 61 and respectively sampled at 44.056 kHz. The sampled stereo signals are alternately applied to an analog-to-digital (A/D) converter 62 converted to digital signals of each 14 bits. Each 14 bits of the digital signal forms one word. The n-th word of the left (or right)-channel signal will be represented by $L_n$ ($R_n$). Within three sampling periods (68.1 $\mu$sec) are formed in sequence six words, $L_n$, $R_n$, $L_{n+1}$, $R_{n+1}$, $L_{n+2}$, and $R_{n+2}$ which constitute one block as shown in FIG. 2.

An error-correcting word generator 63 is provided to add two error correcting redundant words P and Q to each block so as to form a sequence of 8 words $L_n$, $R_n$, $L_{n+1}$, $R_{n+1}$, $L_{n+2}$, $R_{n+2}$, P, and Q within each 68.1 $\mu$sec, which is then applied to the input of an interleave unit 64. In case of recording from another PCM recorder, digital signals of 6 words per block may be applied directly to the error correcting generator 63. The correcting words P and Q are used for the recovery of the original data when a dropout occurs (error is included in data) upon recording or playback. By these two correcting words P and Q, a dropout of one or two words per block can be corrected. In the magnetic tape recording, large dropouts each including more than 2 words, called burst errors, occur dominantly rather than random dropouts. In order to treat this large dropouts, the interleave unit 64 is adapted to randomly rearrange the words coming in time series. In practice, the second and the following words within each block are simply delayed to achieve pseudo-randomization. Consequently, selective delay times should be provided between the input signal to and the output signal from the interleave unit 64. Thus, the interleave unit 64 has a temporary memory for delaying data. Although the temporary memory is usually formed of a random access memory, it may be formed of shift registers.

Figure 3:
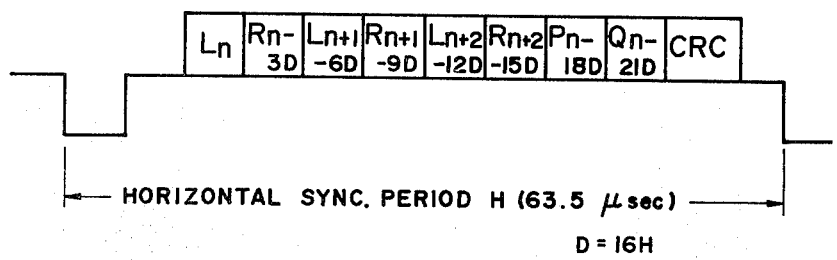

The data in the interleave unit 64 is read, in synchronism with the horizontal synchronizing signal period of video synchronizing signal, at the rate of 63.5 μsec per block. Each block of the digital signal thus rearranged includes three L-channel words, three R-channel words, and two error correcting words. An error detecting (cyclic redundancy check) word generator 65 serves to add a CRC word, as a detecting code for detecting dropout of signal, to each block. The signal thus formed as shown in FIG. 3 is converted by a digital-to-video signal converter 66, to a standard television signal format, which is then recorded on a video tape in a VTR 67. Here, it should be noted that the data recorded on the video tape is one which is pseudo-randomized by the interleave unit 64. The interleave unit 64 always stores older data than the most-recent one of the recorded data. When only the VTR 67 is arbitrarily stopped recording, part of the necessary data are not recorded yet on the video tape and also the data in the interleave unit 64 will be lost from its memory. According to this invention, when the VTR 67 is paused, the interleave unit 64 also stops its operation to hold necessary data as they are.

The reproduction of the recorded signal will hereinafter be described briefly. The reproduced signal from the VTR 67 is amplified by a video amplifier 68, and then fed to a data synchronization signal separator 69 where a synchronizing signal is separated from the reproduced signal. The PCM data is applied to an error detector 70 by which whether it has a dropout or not is checked, and then restored to the original format with the time series relation by a de-interleave unit 71. If a dropout is detected in the reproduced data, a flag is added to the erroneous data. The data including error is corrected for its error by an erroneous data correcting circuit 72. The sequence of digital signal from the circuit 72 is converted by a digital-to-analog (D/A) converter 73 to an analog signal, which is then applied to sample/hold circuits 74 to produce therefrom the original input signal. It will be understood by those skilled in the art that where possible, the recording and playback sections can have their components used in common.

The horizontal synchronizing signal period H is 63.5 μsec, and data are delayed by n units of D=16H (n is an integer). Since each horizontal synchronizing period includes three words, the delay term is expressed by 3nD on word base in FIG. 3. For example, the word $R_{n+2-15D}$ is a R signal generated $15D=15\times16=240$ words before the generation of word $R_{n+2}$ and delayed to the position of $R_{n+2}$.

Figure 4:
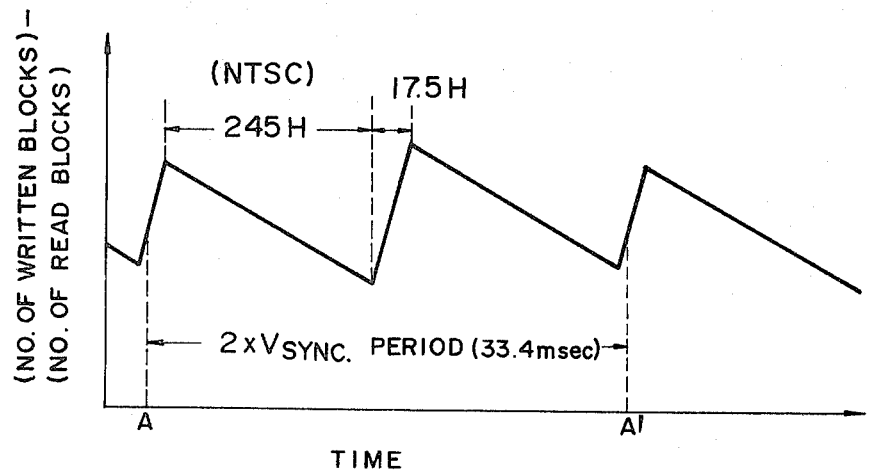
FIG. 4 is a graph of the time change of the difference in the number of inputted and outputted blocks in the memory of the interleave unit of FIG. 1.

The reading and writing data blocks into and out of the interleave unit 64 are controlled by different clocks and thus the amount of data stored in the memory of the interleave unit 64 changes periodically. FIG. 4 shows the amount of stored data, i.e., (the number of written blocks)−(the number of read blocks) with respect to time. The writing operation of the interleave unit 64 is continuously performed, while the reading operation thereof is made only during 245H periods of each vertical period but not during the remaining 17.5H periods during which the vertical synchronizing signal is included. In FIG. 4, the reading operation is made in the gently descending slope portion, but not in the steeply ascending slope portion. This change is repeated for each vertical period V=262.5H (one field) and two vertical synchronizing periods 2V=525H which corresponds to one rotation of the rotating head in VTR is preferably selected as a unit period.

Thus, it will be understood that when editing is performed by pausing recording at an arbitrary point in the video synchronizing period and restarting recording at another arbitrary point, the video signal becomes out of synchronization.

Detailed description will be made hereinafter on how to control the interleave unit 64 in synchronism with the VTR 67 with reference to FIG. 1.

Figure 1:
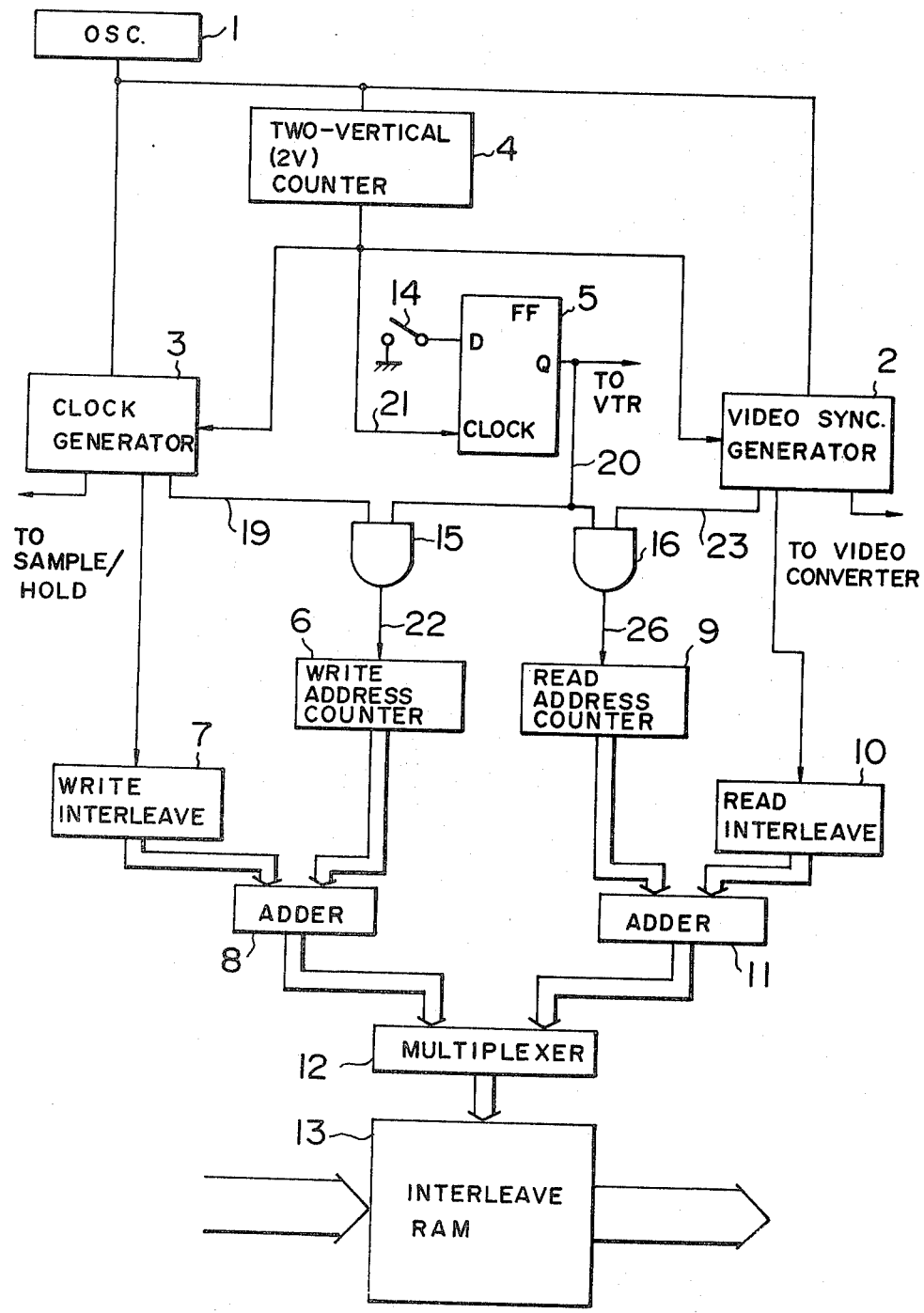
FIG. 1 is a partial block diagram of a PCM recorder according to an embodiment of this invention.

In FIG. 1 in which the interleave unit 64 is shown, there is shown a reference oscillator 1 which may be formed of a crystal oscillator which generates a reference oscillation output for various different clock signals to control the PCM recorder. A video synchronizing signal generator 2 generates a video horizontal synchronizing signal by dividing the frequency of the reference oscillation signal. A clock generator 3 generates a clock signal 19 having a period three times long as the sampling period by dividing the frequency of the reference oscillation signal. A two-vertical (2V) counter 4 divides the reference oscillation signal to produce a timing pulse 21 with a period twice the vertical synchronizing period, 2V. The output 21 from the 2V counter 4 is supplied to the video synchronizing signal generator 2 and to the clock generator 3 so as to synchronize them. These generator circuits may be formed as part of the timing circuit for the PCM recorder. The clock output 21 from the 2V counter 4 is also applied to a D-flip-flop circuit 5, the D-input terminal of which is connected to a manual pause switch 14. The pause signal output, 20 from the D-flip-flop 5 controls the VTR 67 and at the same time is fed to gates 15 and 16. The pause switch 14 gives commands for starting and pausing recording: When it is closed, recording is paused (stopped) and when it is opened, recording is made. When the switch 14 is turned on, the next clock pulse 21 from the 2V counter 4 causes the flip-flop 5 to produce the pause output 20 of low level by which the gates 15 and 16 are closed (holding state). When the switch 14 is turned off and then a clock pulse 21 is applied from the 2V counter 4 to the flip-flop 5, the pause output 20 changes to high level to open the gates 15 and 16. These gates may be formed of AND gates.

The clock generator 3 supplies a write clock signal via the write clock gate 15 to a write address counter 6. The video synchronizing signal generator 2 supplies a read clock signal via the read clock gate 16 to a read address counter 9. Therefore, while the pause signal 20 is kept at low level, the VTR 67 stops operation in that the VTR includes a recording pausing arrangement responsive to the pause signal 20 for stopping the operation, and the address counters 6 and 9 are supplied with no clock signal to hold their counts. The address counters 6 and 9 count their input pulses thereby to count the numbers of written blocks and read blocks, respectively. The write address counter 6 supplies the reference write address output which increments at each block (68.1 μsec) of data to be written as shown in FIG. 2, while the read address counter 9 supplies the reference read address output which increments at each block (63.5 μsec) of read data as shown in FIG. 3. The write interleave circuit 7 can be formed of a read-only-memory (ROM) and periodically produces 8 values indicative of difference addresses with respect to the reference address to delay the 8 words within each write block by predetermined amounts. The read interleave circuit 10 can also be formed of a ROM and periodically produces 8 values indicative of difference addresses to sequentially read the 8 rearranged words within each read block. The outputs of the address counters 6 and 9 are added to those of the corresponding interleave circuits 7 and 10 in adders 8 and 11, respectively. The adders 8 and 11 thus supply write addresses and read addresses to an interleave memory 13 via a multiplexer 12 which switches the write and read operations of the RAM 13. In other words, the combination of the address counters 6 and 9, interleave circuits 7 and 10, adders 8 and 11, multiplexer 12 and memory 13 perform the interleave of dispersedly rearranging the time series data by giving predetermined delays to the respective words of the input data.

Figure 5:
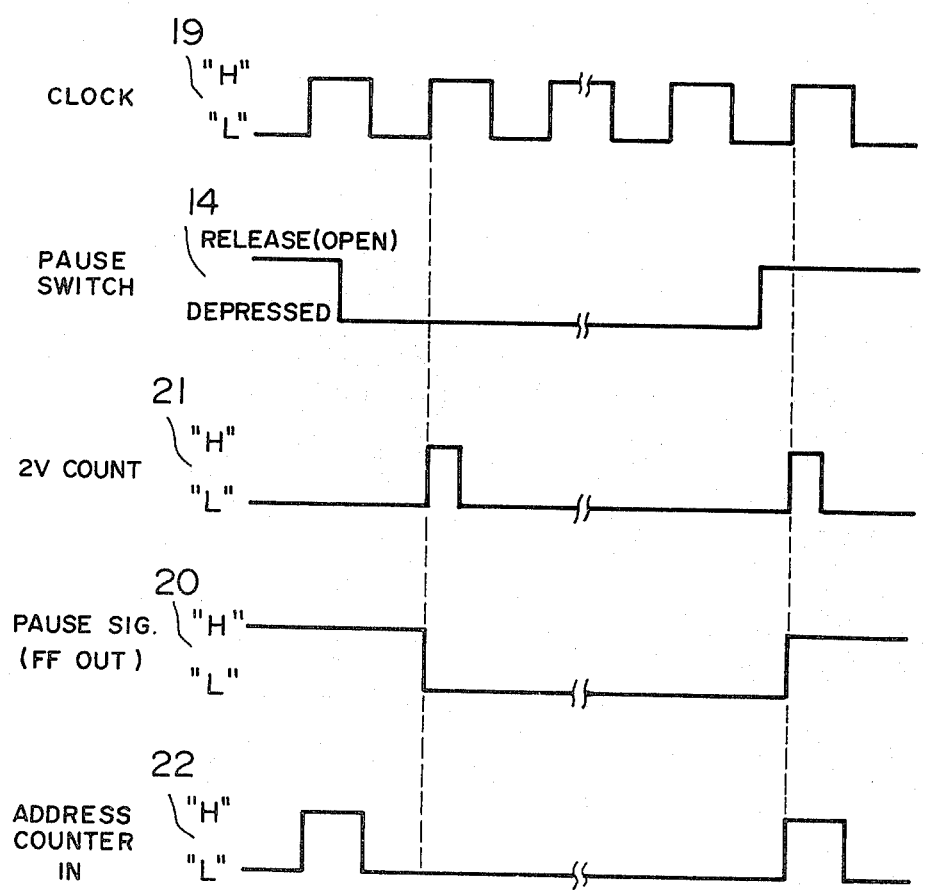
FIG. 5 is a timing chart for illustrating the operation of main part of the circuit arrangement of FIG. 1.

The operation of the circuit arrangement of FIG. 1 will be described with reference to the timing chart of FIG. 5.

When the pause switch 14 has been depressed, the D-input of the D-flip-flop 5 is grounded, and when the timing pulse 21 is generated from the 2V counter 4, the pause signal 20 becomes of low level. Thus, the VTR stops operation, and the gates 15 and 16 are closed to block the clock signal 19 and the video synchronizing signal 23, thus the gates 15 and 16 holding the outputs 22 and 26 at low level, respectively. Since the input signals 22 and 26 are at low level, the address counters 6 and 9 hold their output addresses. The fixed write and read addresses cause the memory 13 to substantially hold the contents thereof at the time when the VTR stopped recording. In this embodiment, since the interleave circuits 7 and 10 continue to operate, the one word written in the memory 13 changes with input signal, while the last read one word is read repeatedly. However, the recorded data in the pausing VTR are not affected and the contents of the memory 13 are not substantially changed.

If the gates 15 and 16 are closed at point A in FIG. 4 to hold the substantial contents of the write and read address counters 6 and 7 and of the memory 13 and reopened at point A' after the two-vertical synchronization period 2V or an integral multiple of that period, data before point A and data after point A' are continuously recorded without disordered interleave at the joint. In this way, data can be edited. The switching point A can be selected at any point within the two-vertical synchronization period.

In the helical scan type VTR practically used, the heads and capstan servo are operated with a period of twice the vertical synchronization period. The rising portion of the curve in FIG. 4 corresponds to the side edges of tape at which the vertical synchronizing signal exists, and the read clock 23 is not supplied from the video synchronizing signal generator 2, thereby no data being outputted. Thus, it is preferable to select the switching point at the rising portion where the vertical synchronizing signal exists and no data is being supplied. Selection of the switching point in this dataless portion obviates the necessity of consideration of the timing of the read clock 23.

Also, the pause signal 20 may be used to control the interleave circuits 7 and 10. For example, after the pause signal 20 has assumed the low level, the interleave circuits 7 and 10 can be controlled not to enter new cycle by the signal 20, as can be understood by those skilled in the art.

While the output of the 2V counter 4 is applied to the video synchronizing signal generator 2 and clock generator 3 to synchronize the generators 2 and 3 with the counter 4 in the above embodiment, other methods can be used for the synchronization.

The tape edited according to the above embodiment has no discontinuous data and video synchronizing signal, and thus no abnormal sound and no muting operation are caused upon playback. Moreover, the above embodiment has simple constituents and can be manufactured without substantial increase of the manufacturing cost.

While one embodiment of a PCM recorder using a VTR has been described, various alterations and modifications will be apparent to those skilled in the art.

What is claimed is:

1. A pulse code modulation (PCM) recorder for recording incoming, time-sequence, digital signals dispersedly on a recording medium, said PCM recorder comprising:
   signal rearranging means for pseudo-randomly rearranging said incoming time-sequence digital signals and for outputting said rearranged digital signals;
   recording means for recording said rearranged digital signals on said recording medium;
   pause switch means for stopping a recording operation;
   means for supplying a control signal in response to the actuation of said pause switch means; and
   transfer means for supplying said control signal to said signal rearranging means and said recording means thereby to stop and drive said signal rearranging means and said recording means synchronously.

2. A PCM recorder according to claim 1, wherein said signal rearranging means includes a memory, means for specifying a write address to said memory, and means for specifying a read address to said memory.

3. A PCM recorder according to claim 2, wherein said transfer means supplies said control signal to said write address specifying means.

4. A PCM recorder according to claim 2, wherein said time-sequence digital signals are formed of blocks, each including a plurality of words, said write address specifying means includes a write address counter for specifying a block write address for each block and a write interleave means for specifying a relative address with respect to the block write address for each word within the block, and said read address specifying means includes a read address counter for specifying a block read address, and a read interleave means for specifying a relative address with respect to the block read address for a word to be read.

5. A PCM recorders according to claim 4, wherein said transfer means supplies said control signal to at least said write address counter and said read address counter.

6. A PCM recorder according to claim 2, further comprising a timing circuit for generating write and read timing signals to control writing and reading of said memory.

7. A PCM recorder according to claim 6, wherein said timing circuit generates said write and read timing signals in a predetermined pattern in each cycle, and said write timing signal has a period longer than said read timing signal, and said read timing signal is not generated during a predetermined period within a cycle, and said control means generates said control signal at a predetermined position within said cycle.

8. A PCM recorder according to claim 7, wherein said predetermined position is set within said predetermined period.

9. A PCM recorder according to claim 1, wherein said digital signals are representative of analog quantities.

10. A PCM recorder according to claim 11, wherein said analog quantities are representative of audio information.

11. A pulse code modulation (PCM) recorder for converting an analog signal to a digital signal and recording said digital signal on a video tape with use of a video synchronizing signal, said PCM recorder comprising:
   an analog/digital converter for converting an analog signal to a digital signal;
   a random access memory for storing said digital signal;
   a video tape recorder for recording a signal read from said memory on the video tape;
   a write address circuit for specifying a write address to said memory;
   a read address circuit for specifying a read address to said memory;
   a clock circuit for generating write and read clock signals to control said write and read address circuits;
   a pause signal generating circuit for generating a pause signal for stopping recording;
   gate means for blocking said clock signals from being supplied to said address circuits by said pause signal; and
   recording pausing means for stopping said video tape recorder by said pause signal.

12. A PCM recorder according to claim 11, wherein said clock circuit defines said video synchronizing signal and does not generate said read clock signal during a predetermined period of the video synchronizing period, and said pause signal generating circuit includes a timing detector for detecting a predetermined position within said predetermined period and generates said pause signal on the basis of the output of the timing detector.

* * * * *